US006402212B1

(12) United States Patent
Hsiao

(10) Patent No.: US 6,402,212 B1
(45) Date of Patent: Jun. 11, 2002

(54) MAGNETIC SWEEPER

(76) Inventor: Chieh-Jen Hsiao, 2F, No. 215, Yu-Te Road, Pei Dist., Taichung (TW)

( * ) Notice: Subject to any disclaimer, the term of this patent is extended or adjusted under 35 U.S.C. 154(b) by 26 days.

(21) Appl. No.: 09/703,757

(22) Filed: Nov. 1, 2000

(51) Int. Cl.[7] .............................. B25J 15/06; B66C 1/04

(52) U.S. Cl. ....................................... 294/65.5; 209/215

(58) Field of Search .......................... 294/65.5; 209/215, 209/228, 229; 414/439, 440; 335/285, 291, 293

(56) References Cited

U.S. PATENT DOCUMENTS

| | | | | | |
|---|---|---|---|---|---|
| 610,767 | A | * | 9/1898 | Monell | 209/215 |
| 1,326,561 | A | * | 12/1919 | Ady | 209/215 |
| 2,455,319 | A | * | 11/1948 | Stearns | 209/215 |
| 2,654,480 | A | * | 10/1953 | Stem | 209/215 |
| 2,693,279 | A | * | 11/1954 | Box et al. | 209/215 |
| 2,729,046 | A | * | 1/1956 | Patterson | 414/440 |
| 6,113,169 | A | * | 9/2000 | Gohman et al. | 294/65.5 |

* cited by examiner

*Primary Examiner*—Dean J. Kramer
(74) *Attorney, Agent, or Firm*—Brooks & Kushman P.C.

(57) ABSTRACT

A magnetic sweeper includes a mounting frame with left and right side walls, a rotating shaft with ends journalled in the left and right side walls, and a cylindrical body rotated with and surrounding the rotating shaft. A plurality of permanent magnets are disposed in a circumferential wall of the cylindrical body and define uppermost and lowermost magnetic linear limits. A guiding member, formed from a non-magnetic material, is secured to the left and right side walls, and includes a major wall with leading and tailing ends that are respectively spaced non-equidistantly from the uppermost and lowermost magnetic linear limits. A collecting member is disposed downstream of and below the uppermost magnetic linear limit for receiving magnetic metal objects captured by means of the permanent magnets. A mounting axle is disposed on the mounting frame and is spaced apart from the rotating shaft for mounting of a wheel member. A coupling member is provided to transmit rolling movement of the wheel member to the rotating shaft for rotating the cylindrical body.

7 Claims, 6 Drawing Sheets

MAGNETIC SWEEPER

BACKGROUND OF THE INVENTION

1. Field of the Invention

The invention relates to a magnetic sweeper for picking up magnetic metal objects scattered on a surface, more particularly to a magnetic sweeper that is simple in construction, and that is easy to operate.

2. Description of the Related Art

Magnetic metal objects, such as nails, nuts, screws, springs, studs, clips, etc., are likely to drop to the floor when in use. In a clean and small space, they can be picked up with bare hands with relative ease. However, it is troublesome to remove such metal objects from a spacious area, such as a yard, a lawn, a work site, and the beach, or small and narrow spaces, such as the ground beneath a car's chassis. There is available a type of magnetic sweeper, such as that shown in FIG. 1, for removing magnetic metal objects from a surface. The magnetic sweeper as shown includes a suction disk 1, a magnet 2 adhered to a bottom side of the suction disk 1, and a handle 3 extending upwardly from a top side of the suction disk 1. In use, the magnetic sweeper is moved along the surface by means of the handle 3, and magnetic metal objects on the surface will be captured by means of the magnetic force of the magnet 2.

A major drawback associated with the above-described magnetic sweeper is that, after a certain amount of metal objects are captured by the magnet 2, the user has to remove them from the magnet 2 one by one, which is very troublesome. Moreover, the user may be pricked by pointed ends of the captured metal objects. In addition, due to the length of the handle 3, the above-described magnetic sweeper cannot access places of a small height. Besides, the magnetic sweeper is bulky and is hence inconvenient to maneuver.

U.S. Pat. No. 4,407,038 discloses a magnetic sweeper that includes a main body member having end walls 16 on which wheels 26 are pivotally mounted. The magnetic sweeper disclosed therein permits relatively easy operation. However, it is inconvenient to remove metallic objects captured by magnets 42.

U.S. Pat. No. 5,285,904 teaches a magnetic sweeper including a catcher member 34 which is manually removable to permit metallic objects picked up by magnetic attraction and held against the catcher member 34 to fall away and into a receptacle for discard. However, the user's hand maybe pricked or cut by pointed ends of the metallic objects when removing the catcher member 34.

SUMMARY OF THE INVENTION

Therefore, the main object of the present invention is to provide a magnetic sweeper that is simple and easy to construct and assemble, and that overcomes the drawbacks associated with the prior art.

Accordingly, a magnetic sweeper of this invention is adapted to be rolled over a surface to pick up magnetic metal objects scattered thereon. The magnetic sweeper includes a mounting frame, a rotating shaft, a cylindrical body, a plurality of magnetically attracting members, a guiding member, a collecting member, a mounting axle, a wheel member, and a coupling member. The mounting frame has left and right side walls spaced apart from each other in an axial direction. The rotating shaft defines an axis, and has left and right ends that are disposed to be respectively journalled in and to extend outboard to the left and right side walls. The cylindrical body is mounted to be rotated with the rotating shaft, and has an outer circumferential wall which surrounds the rotating shaft and which defines a rotating path when the cylindrical body is rotated with the rotating shaft. The magnetically attracting members are disposed in the outer circumferential wall, and are angularly displaced from one another and around the rotating shaft so as to form uppermost and lowermost magnetic linear limits on the rotating path. The uppermost and lowermost magnetic linear limits are diametrically spaced from each other relative to the axis. The guiding member is made of a nonmagnetic material, and includes left and right lateral edges, and a major wall. The left and right lateral edges are opposite to each other in the axial direction and are secured respectively to the left and right sidewalls. The major wall is interposed between the left and right lateral edges, and extends in a transverse direction relative to the axial direction to define leading and tailing ends and an intermediate portion interposed therebetween. The major wall is configured to have a profile such that the leading and tailing ends are respectively spaced outwardly and non-equidistantly from the uppermost and lowermost magnetic linear limits. As such, the magnetic metal objects captured by means of magnetic force at the lowermost magnetic linear limit and adhered to the tailing end slide over the intermediate portion by rotation of the cylindrical body, and fall down by virtue of their own weight once the magnetic metal objects proceed beyond the uppermost magnetic linear limit where the magnetic force is weaker than gravity. The collecting member is disposed downstream of and below the uppermost magnetic linear limit to receive the magnetic metal objects that drop thereinto. The mounting axle is disposed on the mounting frame to extend in the axial direction, and is spaced apart from the rotating shaft. The wheel member is rotatably mounted on the mounting axle and is adapted to roll over the surface. The coupling member is disposed to transmit rolling movement of the wheel member to one of the left and right ends of the rotating shaft so as to rotate the cylindrical body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
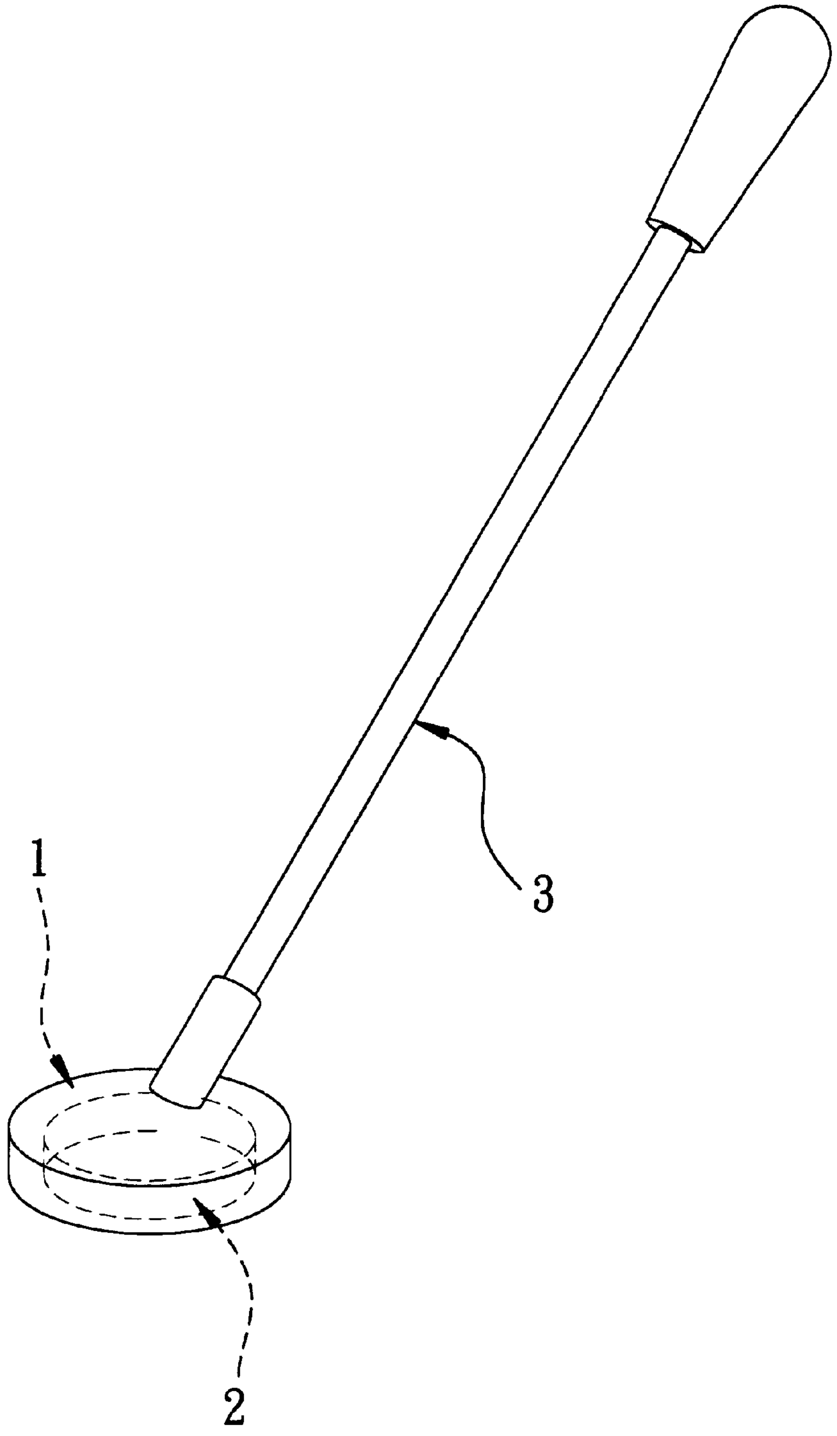
FIG. 1 PRIOR ART
FIG. 1 is a perspective view of a conventional magnetic sweeper.

Before the present invention is described in greater detail, it should be noted that like elements are denoted by the same reference numerals throughout the disclosure.

Figure 2:
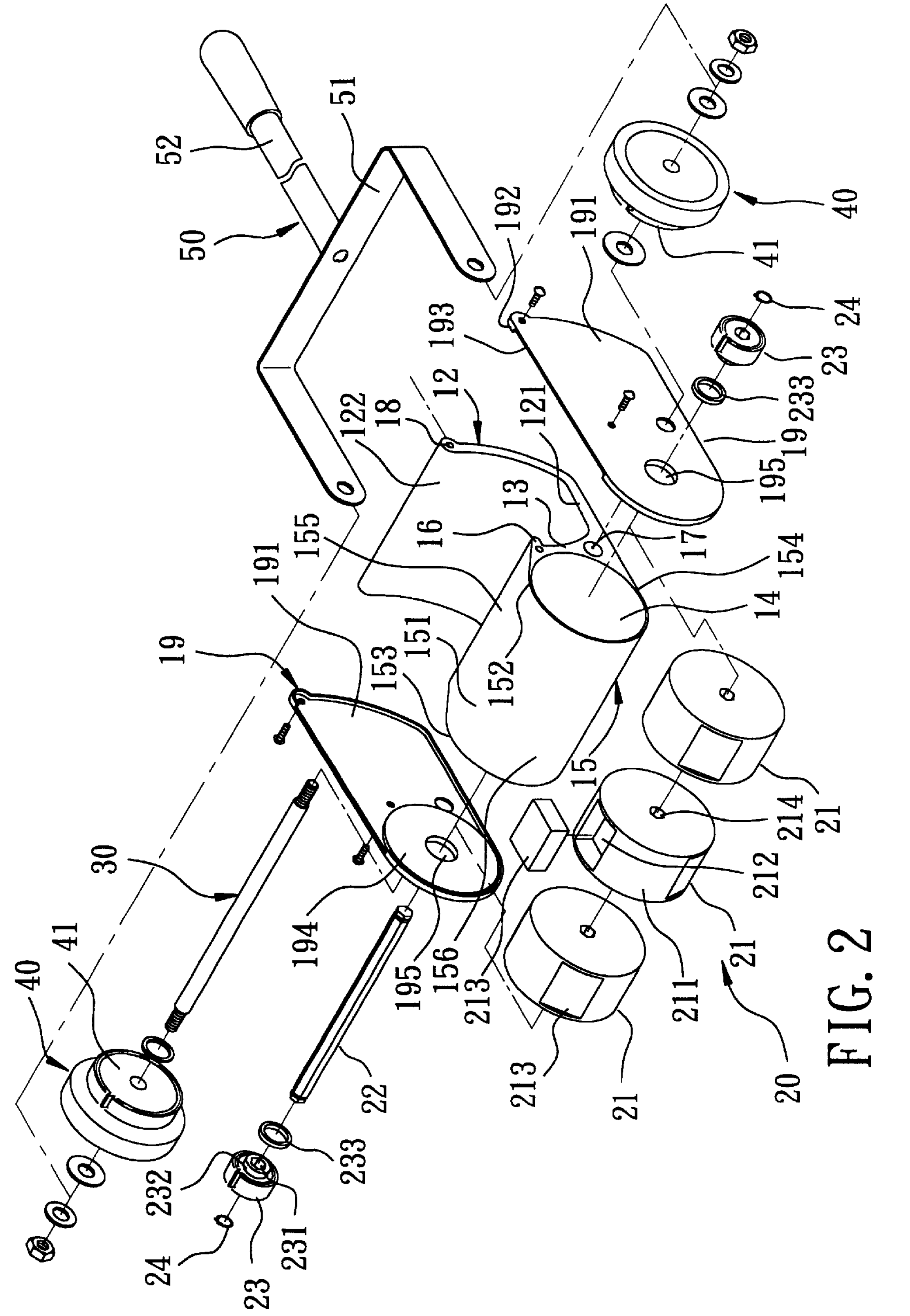
FIG. 2 is an exploded perspective view of the preferred embodiment of a magnetic sweeper according to the invention.
Figure 3:
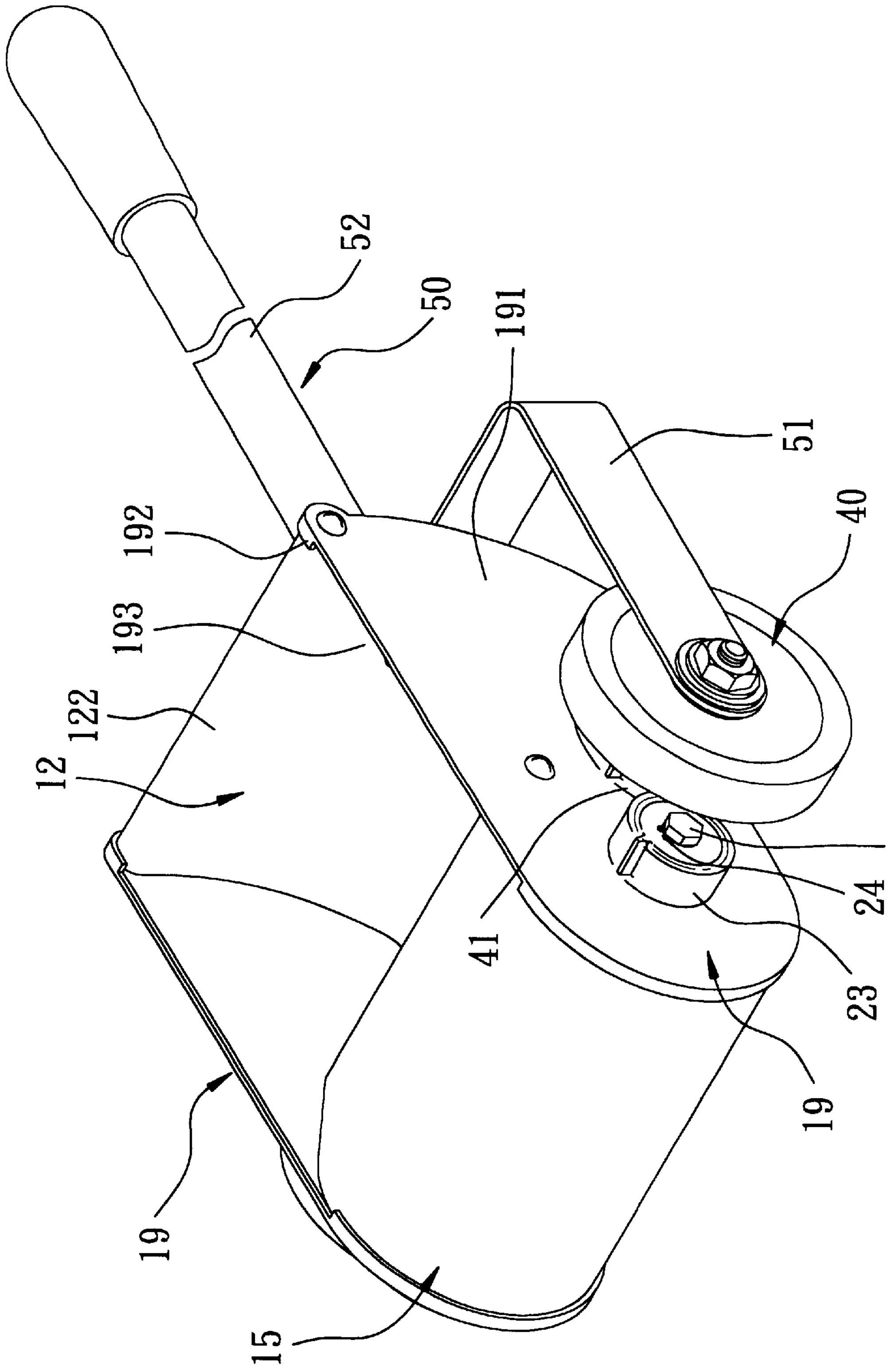
FIG. 3 is an assembled perspective view of the preferred embodiment.
Figure 4:
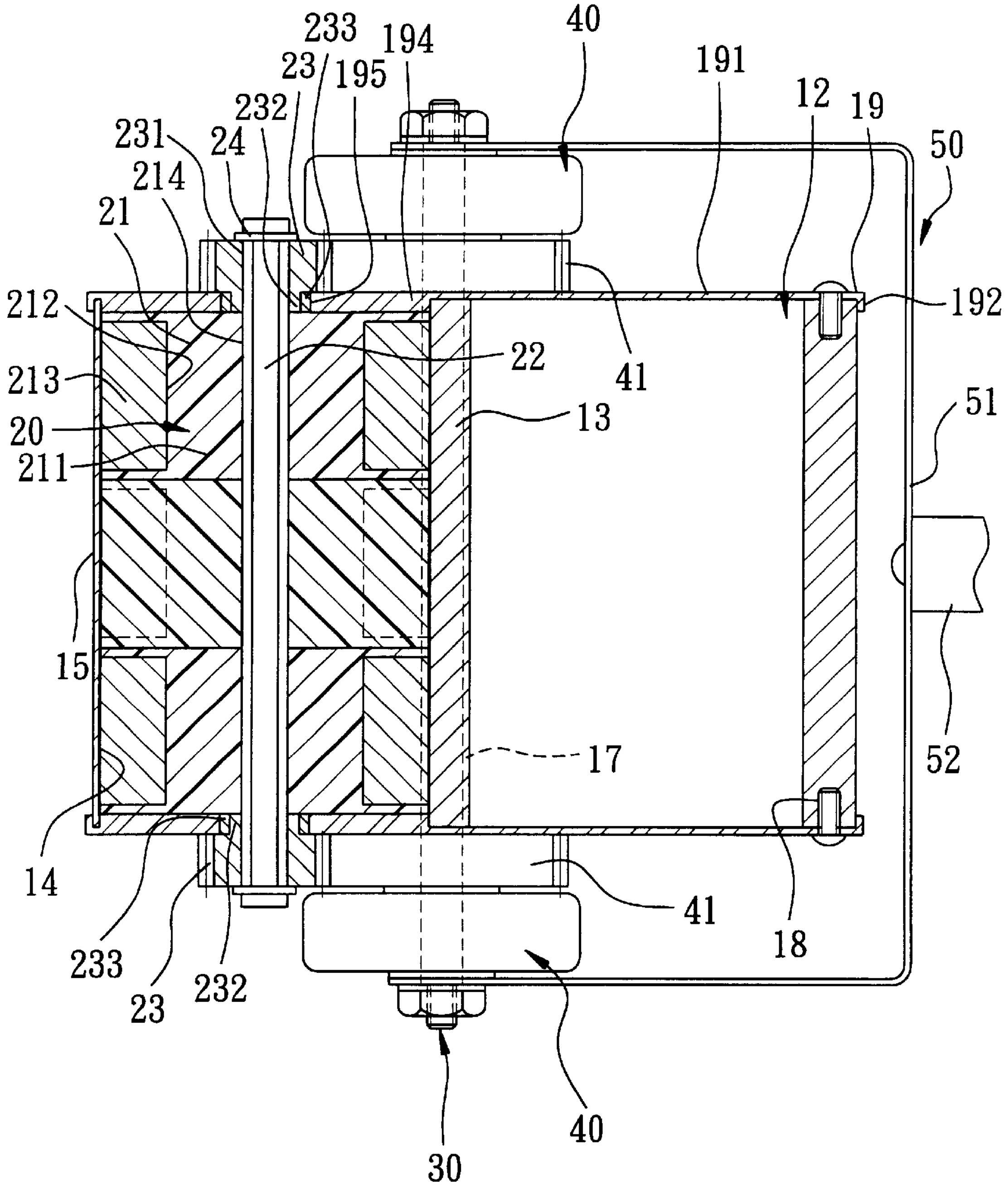
FIG. 4 is a fragmentary top sectional view of the preferred embodiment.

Referring to FIGS. 2, 3 and 4, the preferred embodiment of a magnetic sweeper according to the present invention is adapted to be rolled over a surface to pick up magnetic metal objects scattered thereon. As shown, the magnetic sweeper includes a mounting frame 19, a rotating shaft 22, a cylindrical body 20, a plurality of magnetically attracting members 213, a guiding member 15, a collecting member 12, a mounting axle 30, a wheel member 40, and a coupling member.

The mounting frame 19 has left and right side walls 191 spaced apart from each other in an axial direction. Each of the left and right side walls 191 includes an inner peripheral flange 192 that defines an upper notch 193, and an annular block 194 projecting from an inner side thereof and provided with a through shaft hole 195.

The rotating shaft 22 defines an axis, and has left and right ends disposed to be respectively journalled in and to extend outboard to the left and right side walls 191 of the mounting frame 19. In this embodiment, the rotating shaft 22 is a hexagonal cross-sectioned rod formed with a retaining groove at either end thereof.

The cylindrical body 20 is mounted to be rotated with the rotating shaft 22, and has an outer circumferential wall 211 which surrounds the rotating shaft 22 and which defines a rotating path when the cylindrical body 20 is rotated with the rotating shaft 22. In this embodiment, the cylindrical body 20 includes a plurality of sections 21. Each of the sections 21 is provided with a central hexagonal hole 214 for extension of the rotating shaft 22, and includes a circumferential wall 211 provided with at least one recess 212. Preferably, the recesses 212 in the sections 21 are angularly displaced from one another.

The magnetically attracting members 213, preferably permanent magnets, are respectively disposed in the recesses 212 of the sections 21, and are angularly displaced from one another around the rotating shaft 22 so as to form uppermost and lowermost magnetic linear limits 215, 216 (see FIG. 5) on the rotating path, and to provide a large magnetic surface on the cylindrical body 20. The uppermost and lowermost magnetic linear limits 215, 216 are diametrically spaced from each other relative to the axis of the rotating shaft 22.

The guiding member 15 is made of a nonmagnetic material, such as aluminum or plastic, and includes left and right lateral edges 153, 152, and a major wall 151. The left and right lateral edges 153, 152 are opposite to each other in the axial direction and are secured respectively to the left and right side walls 191. The major wall 151 is interposed between the left and right lateral edges 153, 152, and extends in a transverse direction relative to the axial direction to form leading and tailing ends 155, 154, and an intermediate portion 156 interposed therebetween. The major wall 151 is configured to have a profile such that the leading and tailing ends 155, 154 are respectively spaced outwardly and non-equidistantly from the uppermost and lowermost magnetic linear limits 215, 216 (see FIG. 5).

The collecting member 12 is disposed downstream of and below the uppermost magnetic linear limit 215 for receiving the magnetic metal objects that drop from the major wall 152. In this embodiment, the collecting member 12 includes a bottom wall 121 and an upright wall 122 with a top edge provided with axially extending threaded holes 18. The collecting member 12 and the guiding member 15 are integrally formed with a barrier wall 13 interposed therebetween. The collecting member 12 and the barrier wall 13 cooperatively define a top opening for access of the magnetic metal objects, and two side openings. The barrier wall 13 and the major wall 151 cooperatively define an inner annular bearing surface 14, and left and right annular edges at opposite sides thereof. The inner annular bearing surface 14 surrounds the outer circumferential wall 211 and accommodates rotation of the cylindrical body 20 thereon. The barrier wall 13 is of such a dimension as to cut off the magnetic force at the cylindrical body 20 so that the magnetic force cannot affect the magnetic metal objects collected in the collecting member 12. The barrier wall 13 has a top edge forming a barrier portion 16 that is oriented towards the collecting member 12, and a lower portion formed with an axially extending axle engaging hole 17. During assembly, the left and right side walls 191 of the mounting frame 19 are mounted on left and right ends of the collecting member 12 by means of screws extending into the threaded holes 18 so as to close the side openings and to confine a receiving space among the collecting member 12, the barrier wall 13, and the mounting frame 19, with the annular blocks 194 engaging the left and right annular edges.

The mounting axle 30 is disposed on the mounting frame 19, and extends in the axial direction through corresponding holes in the left and right side walls 191 and the axle engaging hole 17 in the lower portion of the barrier wall 13 such that the mounting axle 30 is spaced apart from the rotating shaft 22. The mounting axle 30 includes left and right anchored ends, which are journalled in and which extend outboard to the left and right side walls 191, respectively.

The wheel member 40 is rotatably mounted on the mounting axle 30, is adapted to roll over the surface, and is disposed to space the tailing end 154 apart from the surface. In this embodiment, the wheel member 40 includes left and right wheel bodies 40 that are respectively and rotatably mounted on the left and right anchored ends of the mounting axle 30 outboard to the left and right side walls 191 of the mounting frame 19.

The coupling member is disposed to transmit rolling movement of the wheel member 40 to one of the left and right ends of the rotating shaft 22 so as to rotate the cylindrical body 20. In this embodiment, the coupling member includes two cogwheels 41 and two pinions 23. Each of the cogwheels 41 is disposed inboard to and is rotated with a respective one of the left and right wheel bodies 40. Each of the pinions 23 is mounted outboard to one of the left and right side walls 191 to be rotated with a respective one of the left and right ends of the rotating shaft 22, and is disposed to mesh with the respective one of the cogwheels 41 so as to be driven thereby. In addition, each of the pinions 23 is provided with a hexagonal through hole 231 for extension of the rotating shaft 22, and is secured on the rotating shaft 22 by means of a retaining ring 24 that engages the retaining groove in the corresponding end of the rotating shaft 22. An annular portion 232 projects from an inner side of each of the pinions 23 to be sleeved over by an annular ring 233. The annular ring 233 is fitted in the shaft hole 195. As the pinions 23 mesh with the cogwheels 41 and are coaxially mounted with the sections 21 on the rotating shaft 22, when the wheel bodies 40 are rotated in one direction, the pinions 23 will turn in an opposite direction.

Alternatively, the mounting axle 30 can be coaxially mounted to be coaxial with the rotating shaft 22, and the coupling member is interposed between and is integrally formed with the rotating shaft 22 and the mounting axle 30 in the axial direction so as to transmit rolling movement of the wheel member 40 to one of the left and right ends of the rotating shaft 22.

The magnetic sweeper further includes a handle 50 secured to the mounting frame 19 for grasping by a user. In this embodiment, the handle 50 includes a generally U-shaped frame 51 and a grip portion 52. The frame 51 has two ends mounted pivotally and respectively on the left and right anchored ends of the mounting axle 30 outboard to the wheel bodies 40. In use, the user can grip the handle 50 and move the wheel member 40 along the surface so as to rotate the cylindrical body 20.

Figure 5:
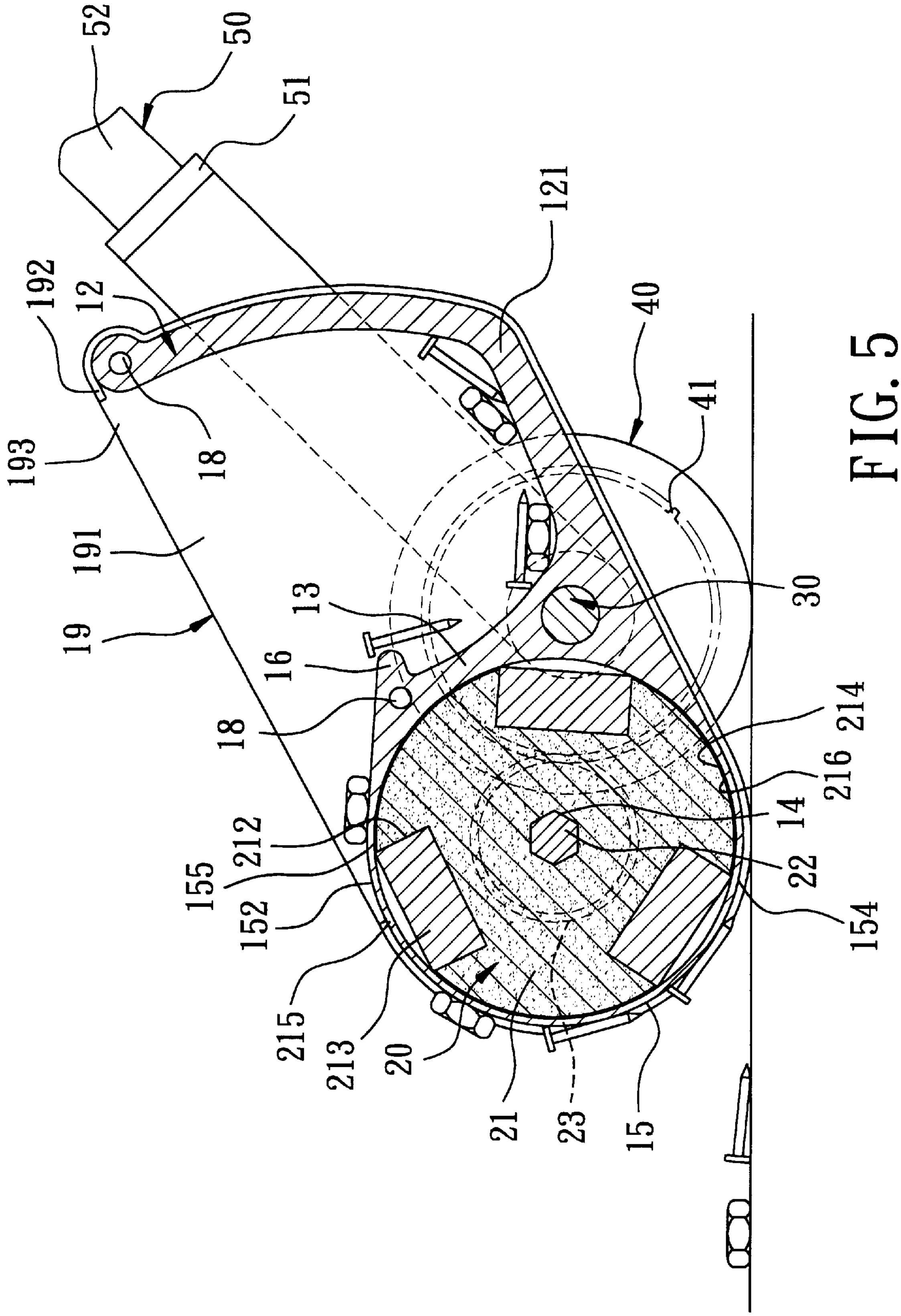
FIG. 5 is a side sectional view illustrating operation of the preferred embodiment.

With reference to FIG. 5, when the magnetic sweeper is pulled or pushed along a surface on which magnetic metal objects are scattered so that the wheel bodies 40 rotate in one direction, the rotating shaft 22 and the sections 21 are brought to rotate in an opposite direction. The magnetic metal objects proximate to the lowermost magnetic linear limit 216 are drawn to the tailing end 154 and slide over the intermediate portion 156 by rotation of the sections 21. The magnetic metal objects will fall into the receiving space of the collecting member 12 by virtue of their own weight once they proceed beyond the uppermost magnetic linear limit 215 and the barrier portion 16 where the magnetic force is weaker than gravity. Due to the thickness of the barrier wall 13 and the arrangement of the barrier portion 16, magnetic metal objects accumulated in the collecting member 12 will not be affected by the magnetic force of the magnetically attracting members 23 in the sections 21 or drawn upwardly to the uppermost magnetic linear limit 215 even if the magnetic sweeper is thereafter pulled or pushed in an opposite direction. As such, the magnetic sweeper according to this embodiment can be conveniently used to remove unwanted magnetic metal objects from a spacious or small and narrow space. In addition, the configuration of the notches 193 facilitates pouring out of the collected magnetic metal objects from the collecting member 12.

Figure 6:
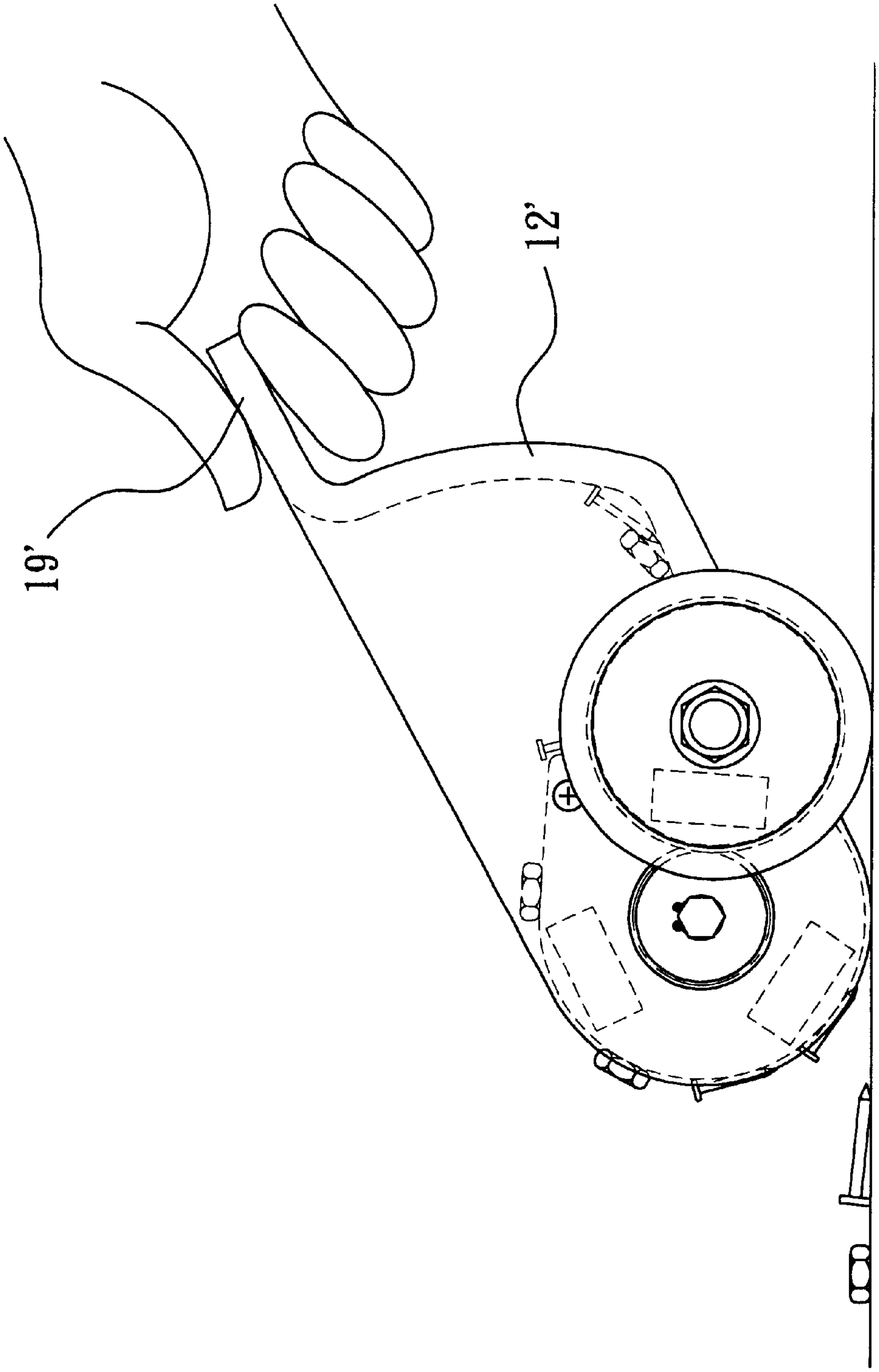
FIG. 6 illustrates a modified embodiment of a magnetic sweeper according to the present invention in a state of use.

FIG. 6 shows a modified and miniaturized embodiment of the magnetic sweeper of the present invention. This embodiment is adapted for sweeping a table or desk surface, and is different from the previous embodiment in that the handle 50 in the previous embodiment is substituted by a grip portion 19' that extends integrally and outwardly from an upright portion of a collecting member 12'.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A magnetic sweeper adapted to be rolled over a surface to pick up magnetic metal objects scattered thereon, said magnetic sweeper comprising:

a mounting frame having left and right side walls spaced apart from each other in an axial direction;

a rotating shaft defining an axis and having left and right ends that are disposed to be respectively journalled in and to extend outboard to said left and right side walls;

a cylindrical body mounted to be rotated with said rotating shaft and having an outer circumferential wall which surrounds said rotating shaft and which defines a rotating path when said cylindrical body is rotated with said rotating shaft;

a plurality of magnetically attracting members disposed in said outer circumferential wall and angularly displaced from one another and around said rotating shaft so as to form uppermost and lowermost magnetic linear limits on said rotating path, said uppermost and lowermost magnetic linear limits being diametrically spaced from each other relative to said axis;

a guiding member made of a nonmagnetic material and including left and right lateral edges opposite to each other in the axial direction and secured respectively to said left and right side walls, and a major wall interposed between said left and right lateral edges, and extending in a transverse direction relative to the axial direction to define leading and tailing ends and an intermediate portion interposed therebetween, said major wall being configured to have a profile such that said leading and tailing ends are respectively spaced outwardly and non-equidistantly from said uppermost and lowermost magnetic linear limits, and such that the magnetic metal objects captured by means of magnetic force at said lowermost magnetic linear limit and adhered to said tailing end slide over said intermediate portion by rotation of said cylindrical body and fall down by virtue of their own weight once the magnetic metal objects proceed beyond said uppermost magnetic linear limit where the magnetic force is weaker than gravity;

a collecting member disposed downstream of and below said uppermost magnetic linear limit to receive the magnetic metal objects that drop thereinto;

a mounting axle disposed on said mounting frame, extending in the axial direction, and spaced apart from said rotating shaft;

a wheel member rotatably mounted on said mounting axle and adapted to roll over the surface; and a coupling member disposed to transmit rolling movement of said wheel member to one of said left and right ends of said rotating shaft so as to rotate said cylindrical body.

2. A magnetic sweeper according to claim 1, wherein said wheel member is disposed to space said tailing end apart from the surface.

3. A magnetic sweeper according to claim 2, wherein said mounting axle includes left and right anchored ends respectively journalled in and extending outboard to said left and right side walls, said wheel member including left and right wheel bodies respectively and rotatably mounted on said left and right anchored ends.

4. A magnetic sweeper according to claim 3, wherein said coupling member includes a cogwheel disposed inboard to and rotated with a respective one of said left and right wheel bodies, and a pinion mounted to be rotated with a respective one of said left and right ends, and disposed to mesh with said cogwheel so as to be driven thereby.

5. A magnetic sweeper according to claim 4, wherein said guiding member and said collecting member are integrally formed with a barrier wall interposed therebetween, said barrier wall and said major wall cooperatively defining an inner annular bearing surface that surrounds said outer circumferential wall and that accommodates rotation of said cylindrical body thereon.

6. A magnetic sweeper according to claim 5, wherein said barrier wall is of such a dimension as to cut off the magnetic force at said cylindrical body so as not to affect the magnetic metal objects collected in said collecting member.

7. A magnetic sweeper according to claim 6, further comprising a handle secured to said mounting frame for facilitating movement of said wheel member across the surface so as to rotate said cylindrical body.

* * * * *